United States Patent
Huang et al.

(10) Patent No.: US 8,289,912 B2
(45) Date of Patent: Oct. 16, 2012

(54) SYSTEM AND METHOD FOR MULTICAST/BROADCAST SERVICE ZONE BOUNDARY DETECTION

(75) Inventors: Kuei-Li Huang, Kaohsiung (TW); Jen-Shun Yang, Zhubei (TW); Jui-Tang Wang, Keelung (TW); Chien-Chao Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 480 days.

(21) Appl. No.: 12/570,238

(22) Filed: Sep. 30, 2009

(65) Prior Publication Data

US 2010/0110963 A1    May 6, 2010

Related U.S. Application Data

(60) Provisional application No. 61/109,596, filed on Oct. 30, 2008.

(51) Int. Cl.
*H04W 4/00* (2009.01)
*H04L 12/28* (2006.01)
(52) U.S. Cl. .................................. 370/329; 370/254
(58) Field of Classification Search .................. 370/254, 370/328, 329
See application file for complete search history.

(56) References Cited

FOREIGN PATENT DOCUMENTS
WO   WO 2009/132255   10/2009

OTHER PUBLICATIONS

IEEE Std 802.16™—2004, IEEE Standard for Local and metropolitan area networks, "Part 16: Air Interface for Fixed Broadband Wireless Access Systems."
IEEE Std 802.16e™—2005 and IEEE Std 802.16™—2004/Cor1—2005, IEEE Standard for Local and metropolitan area networks, "Part 16: Air Interface for Fixed Broadband Wireless Access Systems, Amendment 2: Physical and Medium Access Control Layers for Combined Fixed and Mobile Operation Licensed Brands and Corrigendum 1."
So et al., "Resolving Inter-MBS-Zone Performance Issues Using MBS Zone Groups," MBS Zone Groups, V1, dated Apr. 8, 2008.
WiMAX Forum® Network Architecture, "System Requirements, Network Protocols and Architecture for Multi-cast Broad-cast Services Dynamic Service Flow Based (MCBCS—DSx)," WMF Approved, Nov. 14, 2011, and labeled as Wimax Forum, Proprietary.
Mohanty et al., "A Novel Algorithm for Efficient Paging in Mobile WiMAX," IEEE:48-53 (2007).

*Primary Examiner* — Ronald Abelson
(74) *Attorney, Agent, or Firm* — Finnegan, Henderson, Farabow, Garrett & Dunner, LLP

(57) ABSTRACT

A wireless communication method for providing zone boundary detection performed by a controller managing communications within a multicast/broadcast service (MBS) zone. The method includes assigning to a boundary paging group a first base station communicating within the MBS zone and near a boundary of the MBS zone. The method further includes transmitting, through a second base station which covers a mobile station, to the mobile station information indicating that the boundary paging group corresponds to locations near the boundary of the MBS zone.

24 Claims, 17 Drawing Sheets

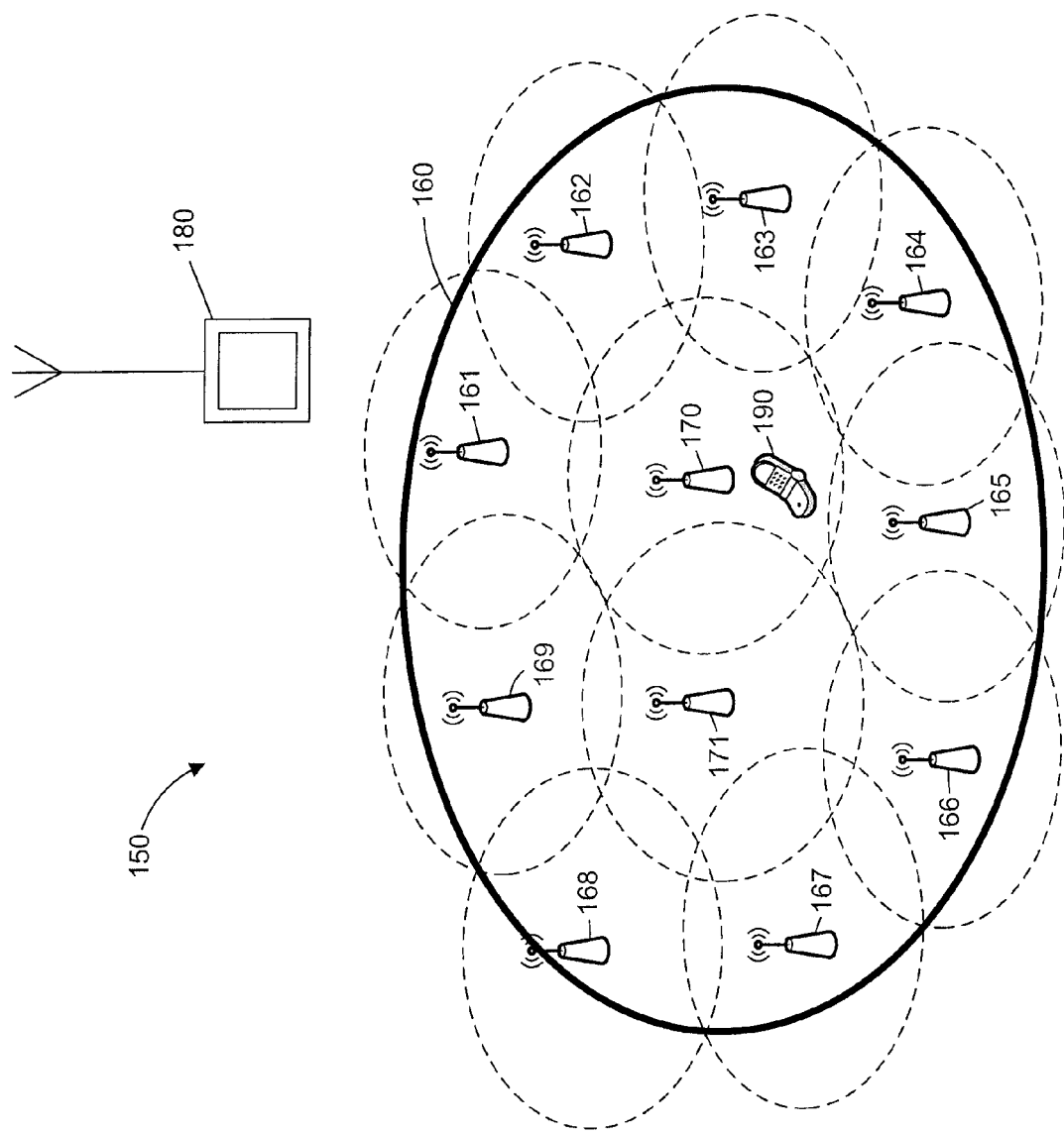

SYSTEM AND METHOD FOR MULTICAST/BROADCAST SERVICE ZONE BOUNDARY DETECTION

RELATED APPLICATIONS

This application is based upon and claims the benefit of priority from U.S. Provisional Patent Application No. 61/109,596, filed Oct. 30, 2008, the entire contents of which are incorporated herein by reference.

FIELD OF THE DISCLOSURE

This invention is directed generally to wireless communication networks, systems, and methods and, more particularly, to multicast/broadcast service zone boundary detection in a wireless network.

BACKGROUND

Wireless networks, for example, Worldwide Interoperability for Microwave Access (WiMAX) networks, provide different types of services to portable devices, e.g., mobile stations (MSs), which receive wireless signals from the network's base stations (BSs). One of these services is a multicast/broadcast service (MBS), through which the network multicasts or broadcasts messages, called advertisements, to one or more MSs covered by the service. A service area in which a service is provided to MSs can be divided into two or more coverage areas, such that different sets of BSs cover different coverage areas. For instance, to provide MBS, an MBS service area may be divided into two or more different coverage areas, each called an MBS zone. An MBS zone is a logical collection of coverage areas of a set of BSs which synchronize with each other and provide simultaneous and similar multicast/broadcast advertisements to MSs covered by that set of BSs. The set of BSs covering one or more MBS zones may be synchronized via a central controller station, called an MBS controller. MBS can be provided to an MS in an idle mode, in which, unlike in an active mode, the MS listens to wireless signals intermittently. An idle MS within an MBS zone receives information about the timing of the synchronized advertisements in that MBS zone and therefore can synchronize the MS's listening intervals with BS's intervals for sending the advertisements.

Mobile stations move from one location to another. As long as an MS relocates within the same MBS zone, because the MS is already synchronized with the BSs in that MBS zone, the MS will continue receiving the advertisements seamlessly. However, when an MS relocates to a new MBS zone, the new MBS zone could have a different set of MBS parameters, e.g., different timings for its advertisements. In this case, the relocated MS must be "handed off" to the new MBS zone by, for example, receiving information about the MBS parameters of the new MBS zone, such that the MS continues receiving the advertisements in the new MBS zone. If the MBS controller detects the relocation in advance, it can prepare for the handoff and provide the new information to the idle MS in time, such that the MS can synchronize with the new MBS zone and receive advertisements in that zone with little delay, thus experiencing a smooth handoff.

When an MS is in active mode, the active MS registers and regularly communicates with a "serving BS" which covers that MS. Thus, the location of an active MS is known to be within the coverage area of its serving BS. If a service is provided to active MSs, when an active MS relocates from one coverage area to another, such relocation is detected because the location of the active MS is known to the network. However, maintaining an MS in an active mode, compared to an idle mode, increases energy consumption and thus undesirably increases usage of the MS's battery. An MS in idle mode, on the other hand, consumes less energy. Therefore, some services, like MBS, do not require an MS to be in active mode and are provided to idle MSs. A mechanism for paging an idle MS has been described in IEEE Std. 802.16e-2005 titled "Air Interface for Fixed and Mobile Broadband Wireless Access Systems," the contents of which are incorporated herein by reference. However, a new mechanism is needed to prepare for and to perform a handoff of an idle MS from one MBS zone to another.

SUMMARY

In accordance with the present disclosure, there is provided a wireless communication method for providing zone boundary detection performed by a controller managing communications within a multicast/broadcast service (MBS) zone, the method comprising: assigning to a boundary paging group a first base station communicating within the MBS zone and near a boundary of the MBS zone; and transmitting, through a second base station which covers a mobile station, to the mobile station information indicating that the boundary paging group corresponds to locations near the boundary of the MBS zone.

Also in accordance with the present disclosure, there is provided a wireless communication method for providing zone boundary detection performed by a base station within a multicast/broadcast service (MBS) zone, the method comprising: receiving information from a controller managing communications within the MBS zone, the information indicating that a boundary paging group corresponds to locations near a boundary of the MBS zone; and transmitting the information regarding the boundary paging group to a mobile station covered by the base station.

Further, in accordance with the present disclosure, there is provided a zone boundary detection method performed by a mobile station, the method comprising: storing information indicating that a boundary paging group corresponds to locations near a boundary of a multicast/broadcast service (MBS) zone; receiving information, from a base station which covers the mobile station, including information about a paging group of the base station; and identifying that the mobile station is communicating near the boundary of the MBS zone, if the paging group of the base station is the same as the boundary paging group.

Also, in accordance with the present disclosure, there is provided a base station comprising: a storage for storing information about a boundary paging group for the base station, corresponding to locations near a boundary of a multicast/broadcast system (MBS) zone; and a transmitter for transmitting the information about the boundary paging group to a mobile station covered by the base station.

Further, in accordance with the present disclosure, there is provided a mobile station comprising: a storage for storing information which corresponds a boundary paging group with locations near a boundary of a multicast/broadcast system (MBS) zone; a receiver for receiving information about a paging group of a base station which covers the mobile station; and a processing unit for comparing the paging group of the base station with the boundary paging group, and for determining that the mobile station is communicating near the boundary of the MBS zone, if the paging group is the same as the boundary paging group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

FIG. 1B illustrates a Multicast/Broadcast Service (MBS) zone, consistent with an exemplary embodiment.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1A:
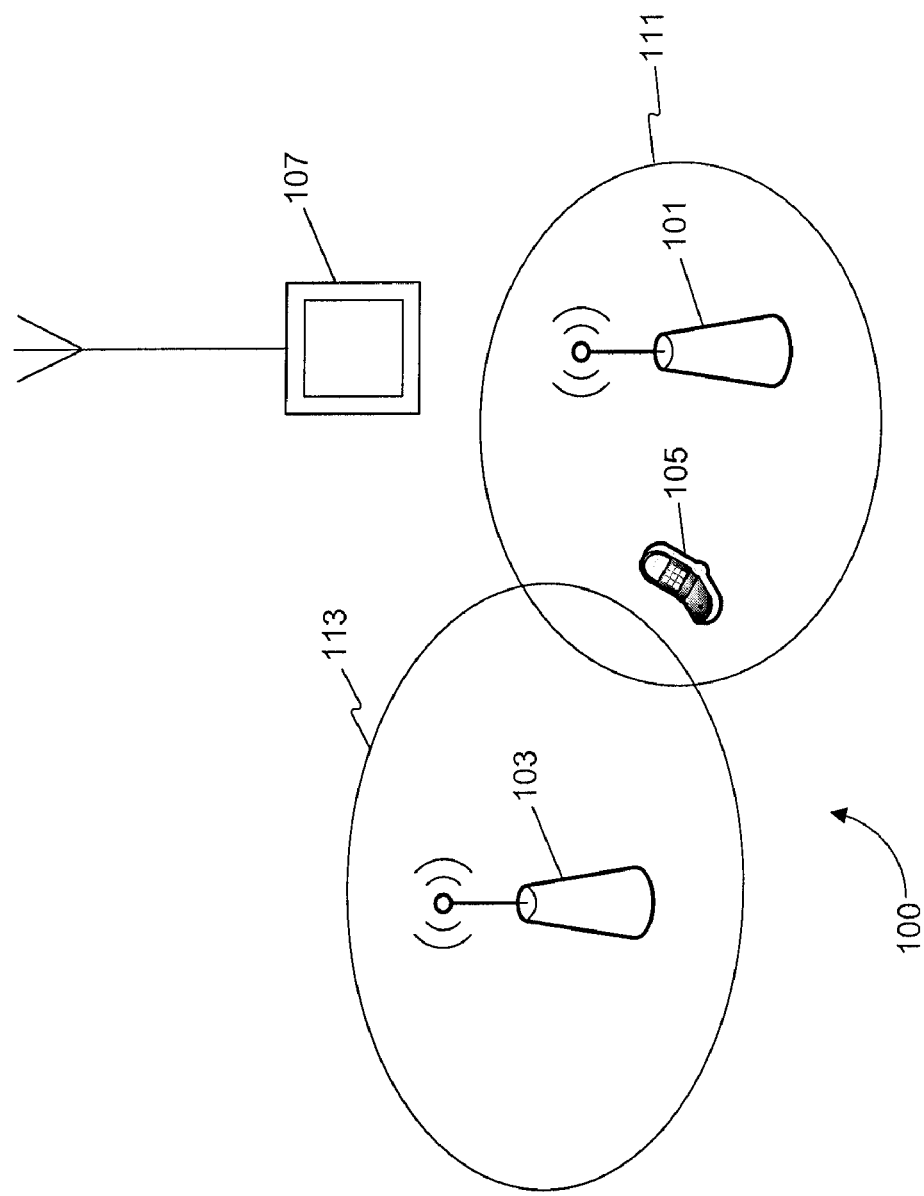
FIG. 1A illustrates a mobile station covered by two base stations, consistent with an exemplary embodiment.

FIG. 1A illustrates a communication system 100 including base stations (BSs) 101 and 103, a mobile station (MS) 105, and a controller station (CS) 107. BS 101 covers a coverage area 111, that is, BS 101 can communicate with mobile stations located in coverage area 111. Similarly, BS 103 covers a coverage area 113. In FIG. 1A, MS 105 is located in coverage area 111 and is therefore covered by, i.e., can exchange signals with, BS 101. CS 107 is in communication with, and controls, BS 101 and BS 103. Therefore, MS 105 is also covered by CS 107. In some embodiments, CS 107 communicates with BS 101 and BS 103 via wireless communication. In some embodiments, CS 107 communicates with BS 101 and BS 103 via wired connections.

In some embodiments, an MS in an active mode (active MS) is tracked with the granularity of BS coverage areas. An active MS is an MS which has its radio interface continually turned on and can listen and talk to a BS covering that MS. An active MS registers with that BS, which is considered the serving BS for the active MS. For example, in FIG. 1A, if MS 105 is in active mode, it registers with BS 101, and therefore is associated with and is assigned by CS 107 to exchange messages with BS 101. BS 101 is considered the serving BS for active MS 105. This association between active MS 105 and serving BS 101 is recorded in a registration table. In some embodiments, the registration table is stored and updated by CS 107. In some embodiments, the registration table is updated by one or more BSs. An active MS regularly exchanges signals with its serving BS, and thus is tracked to be within the coverage area of its serving BS. As an MS relocates, or the traffic load on BSs change, the MS may be handed off from one BS to another. For example, in FIG. 1A, as MS 105 moves farther from BS 101 and enters coverage area 113, MS 105 may switch its serving BS by de-registering from BS 101 and registering with BS 103. In some embodiments, the decision to switch serving BS for an MS is made by BSs 101 and 103. In some other embodiments, the decision to switch is made by CS 107.

In some embodiments, when an active MS is not used for a specific period of time, it switches to an idle mode to conserve battery power. Upon entering the idle mode, the MS relinquishes all of its connections and states associated with its present serving BS, and the MS remains not registered with any specific BS while in idle mode. Further, while in idle mode, the MS alternates between waking periods, during which it listens for wireless signals, and sleeping periods, during which it may turn off its radio interface, may not perform any functions, or may performs functions other than listening to wireless signals. The periodicity of this alternation, that is the time interval between the starts of two consecutive sleep periods or waking periods, is referred to herein as a "paging cycle". The timing of these paging cycles, i.e., the timing of waking periods, is deterministic for each MS in idle mode (idle MS). That is, for each idle MS, the start time and end time of each waking period can be determined and is known to the BS or the CS covering that MS.

The MS may remain in the idle mode until the MS user tries to connect to the network using the MS, or until a message addressed to that MS, e.g., a phone call or a text message, arrives through the network. At that time, the network needs to locate the idle MS and cause a command message to be sent to cause the MS to become active. This should result in the MS registering with a BS that can cover it at its present location, and thus enable the MS to re-enter the network. In some embodiments, these command messages are sent to an idle MS through paging messages or through advertisements. In some embodiments, during each waking period, an idle MS finds a "preferred BS", e.g., a BS that is located nearby, or from which the MS receives strong signals. The MS then listens for radio transmissions from that preferred BS; those radio transmissions may include paging messages relevant to that MS, or advertisements sent by one or more base stations to all MSs in their coverage areas.

Because an idle MS is not registered with any BS, a mechanism different from that used for an active MS is provided to track the location of the idle MS. Such tracking is utilized when the network has a message to send to the idle MS to, for example, re-enter the network as an active MS. In some embodiments, a controller station for a paging group (a "PG controller") tracks the location of an idle mode MS by using a paging group (PG) mechanism. In accordance with the PG mechanism, a network coverage area is subdivided into one or more PG areas, some of which may overlap. For each PG area, the set of BSs that cover that PG area are assigned to the same paging group. A PG is a logical collection of BSs provided in order to detect the location of idle MSs. In some embodiments, BSs in the same PG are geometrically near each other. A BS that covers the intersection of two overlapping PG areas, therefore, belongs to both of those PGs. In some embodiments, the wireless messages that are sent by a BS include paging advertisements which further include a paging group list (PG list) that lists a paging group identification (PG ID) of each of the one or more PGs to which the BS belongs. In various embodiments, the network coverage area can be the whole wireless network area, part of that network area, or an MBS zone.

In accordance with the PG mechanism, the network can locate an idle MS with the granularity of paging group areas. In some embodiments, this locating is performed by a PG controller which stores the information about the allocation of BSs to different PGs and which is in communication with those BSs. When an MS enters the idle mode, the PG controller creates an entry in its database noting the PG which covers the MS at that time. Moreover, the preferred BS for that idle MS informs the MS of the timing of advertisements in that PG. The idle MS uses this information to determine the timing of the MS's wake periods. In some embodiments, during its waking periods, the idle MS receives the PG list inserted in the paging advertisements that it receives, and thus identifies the PG that covers the MS. When an MS moves from the coverage area of one PG to that of a different PG, the MS determines the change in the PG by the change in the PG ID that it receives. Upon such determination, the MS informs the PG controller of the change in its location by sending to the PG controller, through its preferred BS, a "location update". When the PG controller receives the location update from the MS, it updates its database, noting that the MS is covered by the new PG.

In these embodiments, in order to deliver a message to an idle MS located in a PG, the PG controller broadcasts a mobile-paging-advertisement with the identification of that idle MS through all BSs belonging to that PG. The MS, during its waking period, receives the mobile-paging-advertisement from its preferred BS, identifies the MS ID included in the advertisement as its own identification, and responds to the inserted message. The message may, for example, request the MS to perform a location update, or to re-enter the network by entering into active mode and registering with a BS that covers the MS as its serving BS.

In addition to delivering messages and calls to a specific MS, a wireless network may also provide other types of messages that are not addressed to any specific MS. In some embodiments, the wireless network delivers multicast/broadcast service (MBS) messages to MSs. In these embodiments, the service area is divided into one or more MBS zones. An MBS zone is controlled by a controller station for that MBS zone (an "MBS controller") which sends, through synchronized BSs covering the MBS zone, data packets, called advertisements, to idle MSs located inside that MBS zone.

FIG. 1B illustrates an MBS zone system 150 for an MBS zone 160 consistent with an exemplary embodiment. MBS zone system 150 includes multiple BSs 161-171, and an MBS controller 180. Each of BSs 161-171 is located in the middle of a coverage area for that BS, each coverage area delineated by a broken line. The union of these coverage areas covers MBS zone 160, shown as the dark thick line. MBS controller 180 is in communication with BSs 161-171, and through them sends advertisements to MSs that are located inside MBS zone 160. BSs 161-171 synchronously send broadcast/multicast messages received from MBS controller 180. In some embodiments, MBS controller 180 controls more than one MBS zone, and thus can send different advertisements to different MBS zones. In some embodiments, MBS controller 180 includes in the advertisements for each MBS zone, an MBS zone identification (MBS zone ID) which uniquely identifies that MBS zone. In some embodiments, an idle MS in MBS zone receives the advertisements though its preferred BS. For example, considering an exemplary MS 190 in FIG. 1B, because MS 190 is located within the coverage area of BS 170, BS 170 is allocated as preferred BS for MS 190. In some embodiments, the MBS controller sends advertisements to an idle MS using a daisy-chain mechanism in the MBS zone in which that MS is located. The MBS controller does not require to determine the location of the MS within an MBS zone, or the preferred BS for that MS. In some embodiments, the MBS controller keeps track of the MSs that are located inside each MBS zone and also the pre-determined waking periods of those MSs.

Figure 2:
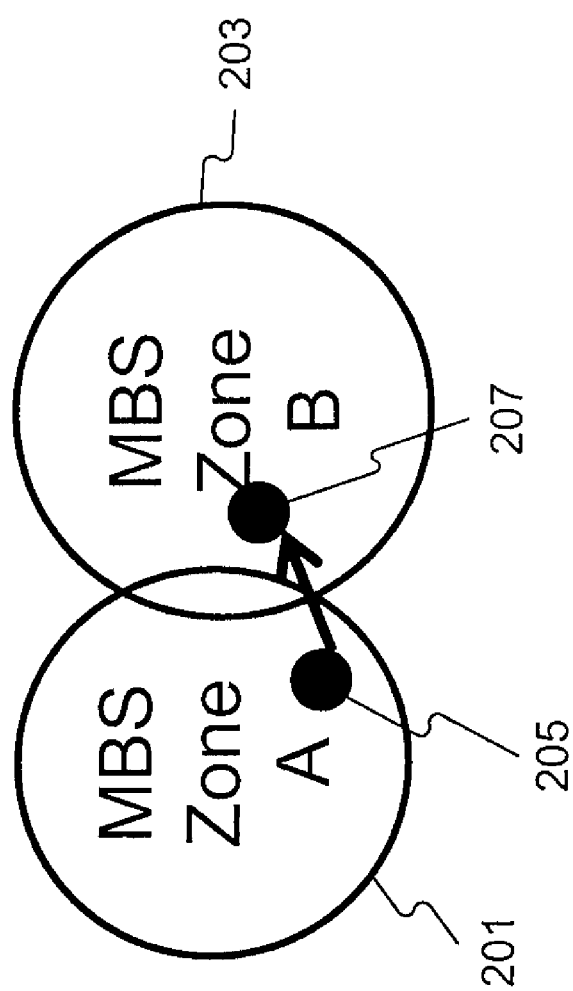
FIG. 2 illustrates a mobile station relocating from inside one MBS zone to another MBS zone, consistent with an exemplary embodiment.

An idle MS may change its location and move from one MBS zone to another. FIG. 2 illustrates an idle MS relocating from inside one MBS zone to another MBS zone, consistent with an exemplary embodiment. FIG. 2 shows two neighboring and partially overlapping MBS zones 201 and 203, respectively labeled A and B. An idle MS is originally located at location 205 inside MBS zone A and therefore receives advertisements transmitted inside MBS zone A. The MS subsequently relocates to location 207 inside MBS zone B and will therefore receive advertisements transmitted inside MBS zone B.

In some embodiments, when an MS relocates from one MBS zone to another, e.g., from a first MBS zone to a second MBS zone, in order to maintain the service continuity, an inter-zone handoff mechanism operates to anticipate the handoff and to reduce latency in the handoff. Reducing latency in the handoff process improves the continuity and quality of the wireless service. To that end, in some embodiments, the inter-zone handoff utilizes a mechanism that detects an idle MS near a boundary of an MBS zone and thus performs operations in preparation of a possible handoff. In some embodiments, these operations include location updates by the idle MS, which inform the MBS controller, or the preferred BS, that the MS is near the boundary of an MBS zone and thus a handoff may be required soon, or that the MS has already entered a new MBS zone and a handoff must be performed.

Figure 3:
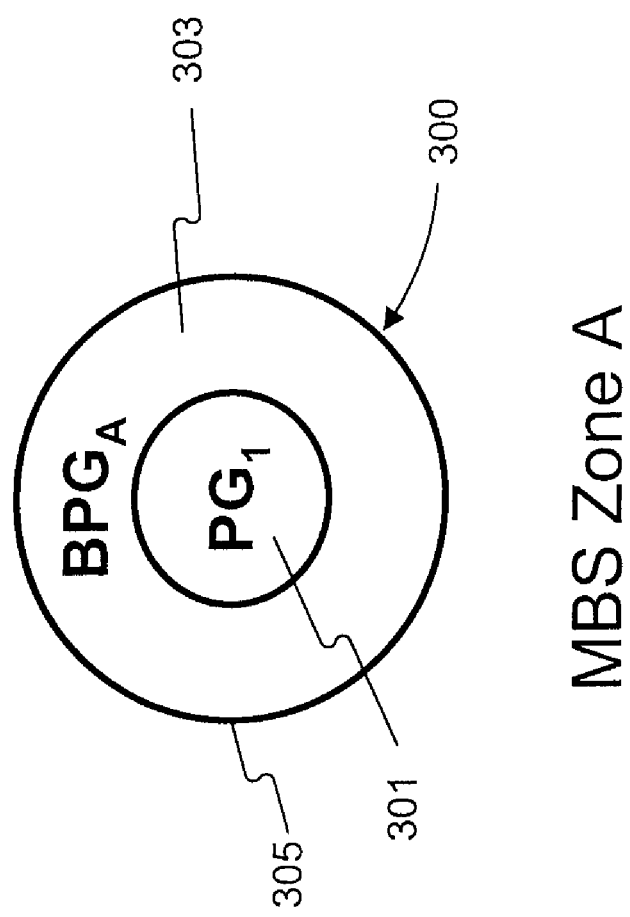
FIG. 3 illustrates an MBS zone with a boundary paging group, consistent with an exemplary embodiment.

In some embodiments, the PG mechanism is utilized to provide for an MBS zone a specific type of PG, called a boundary paging group (BPG). FIG. 3 illustrates an MBS zone 300, consistent with an exemplary embodiment. MBS zone 300, labeled A, is divided into a non-boundary paging group (non-BPG) 301, labeled $PG_1$, located in the middle, and a BPG 303, labeled $BPG_A$, which is located at the boundary of MBS zone 300, and surrounds $PG_1$. In some embodiments, only one BPG is identified for each MBS zone. The number of non-BPGs in an MBS zone, on the other hand, can be zero, one, or more than one, depending on various factors, e.g., size of the MBS zone, number of BSs in the MBS zone, and features of the system for tracking the location of an MS while in the MBS zone.

In some embodiments, a BPG associated with an MBS zone is formed as a paging group that includes those BSs in that MBS zone which are located near the boundary of the MBS zone, such that BPG BSs cover the boundary of the MBS zone, while non-BPG BSs do not cover the boundary of the MBS zone. In FIG. 3, the BSs in $BPG_A$ cover boundary 305 of the MBS zone A, while the BSs in $PG_1$, do not cover boundary 305. For example, in the MBS zone system 150 of FIG. 1B, BSs 161 to 169 can belong to a BPG for MBS zone 160, because each of them covers a portion of the boundary of MBS zone 160. On the other hand, BSs 170 and 171 belong to one or more non-BPGs for MBS zone 160, because none of them covers any portion of the boundary of MBS zone 160.

Each BPG is assigned a unique PG ID, called a boundary paging identification (BPG ID). In some embodiments, a BPG ID includes an attribute which indicates that the ID belongs to a BPG and not a non-BPG. In various embodiments, a BS is assigned to a BPG and a BPG ID is assigned to that BS by a PG controller, or by an MBS controller, or through a cooperation of a PG controller and an MBS controller. For example, the MBS controller can provide information about which BSs belong to each MBS zone, and which BSs are located near the boundary of each MBS zone; while the PG controller can provide information about PGs and their identifications. In some embodiment, a hybrid controller performs the functions of both a PG controller and an MBS controller. Herein, the term controller is used to variably represent a PG controller, an MBS controller, or a hybrid controller, and its type can be determined from the function performed by that controller. In some embodiments, when an MS subscribes to the service of an MBS zone, the MS receives the corresponding BPG ID as part of the paging advertisements sent by a controller through the BSs in the MBS zone. In other embodiments, each BS in a BPG receives the corresponding BPG ID from a controller, and inserts that BPG ID in the advertisements that it sends to all MSs covered by that BS.

Figure 4:
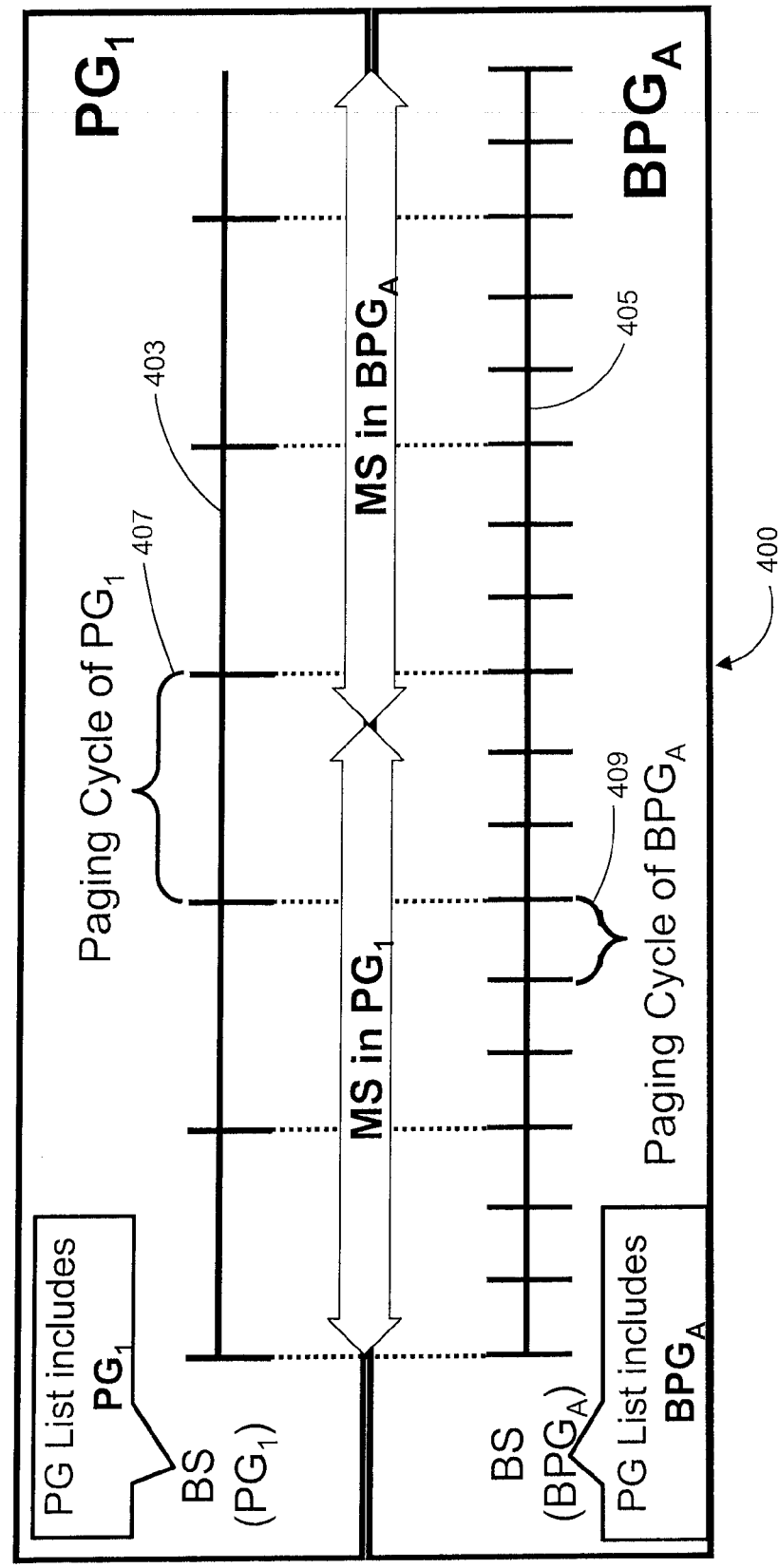
FIG. 4 illustrates paging cycles in a boundary paging group and a non-boundary paging group, consistent with an exemplary embodiment.

To reduce latency in location update or handoff, the paging cycle of a BPG can be adjusted, as depicted in the FIG. 4. FIG. 4 illustrates a schematic 400 of paging cycles for MSs in a BPG and for MSs in a non-BPG, in accordance with an exemplary embodiment. In FIG. 4, a time line 403 depicts the paging cycles of a non-BPG in an MBS zone, e.g., $PG_1$, in FIG. 3, and a time line 405 depicts the paging cycles of a BPG in the same MBS zone, e.g., $BPG_A$, in FIG. 3. Time line 403 for the non-BPG is divided into units of a paging cycle 407, and time line 405 for the BPG is divided into units of a paging cycle 409. In the present embodiment, BPG paging cycles are not equal to the non-BPG paging cycles. For example, in the embodiment depicted in FIG. 4, BPG paging cycle 409 is one third of non-BPG paging cycle 407. Therefore, an MS in an area covered by $BPG_A$ listens to paging messages three times more frequently than an MS in an area covered by $PG_1$. Such an increase in the paging frequency in a BPG reduces the latency in detecting the arrival or departure of an MS in or from a BPG and therefore improves inter-zone handoffs of MSs travelling between neighboring MBS zones. In some embodiments, the paging cycle for a BPG and for a non-PGS in an MBS zone is determined by a controller. In some embodiments, when an idle MS relocates from one paging group to another paging group, the MS receives, through advertisements, parameters indicative of a new paging cycle and adjusts its paging cycle accordingly.

Figure 5:
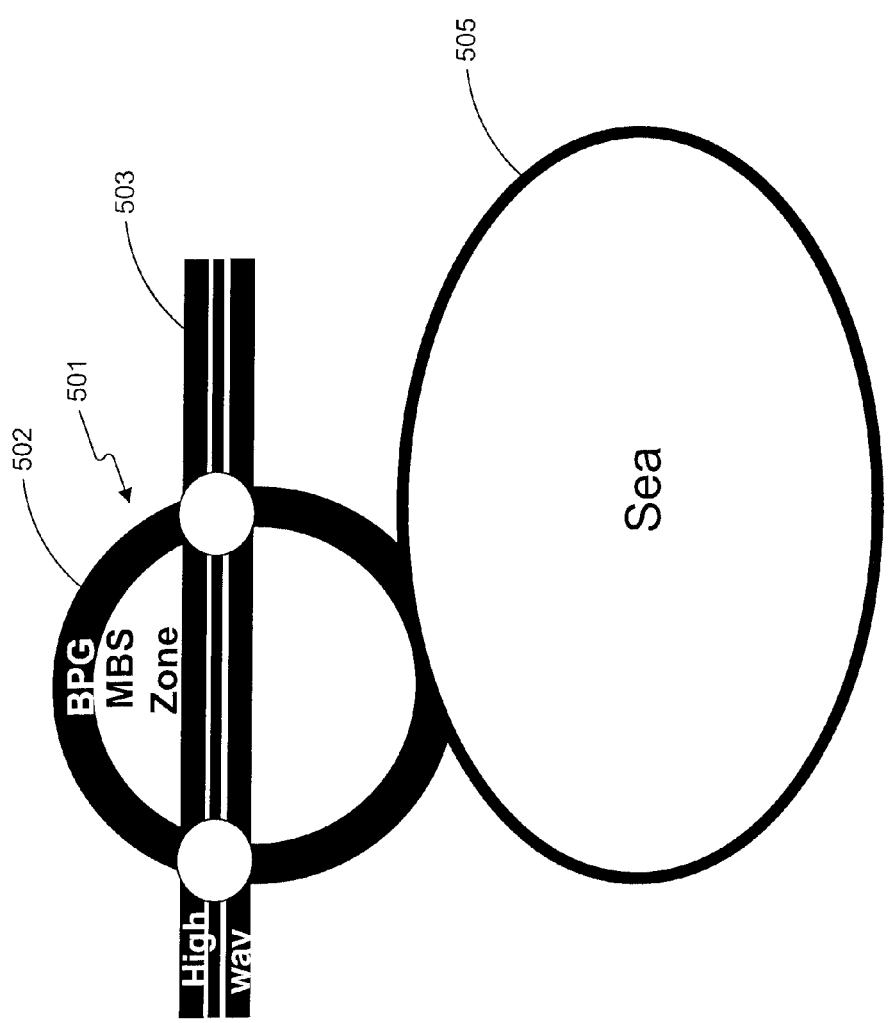
FIG. 5 illustrates an MBS zone, consistent with an exemplary embodiment.

Also to improve inter-zone handoff performance for idle MSs, the number and location of BSs in a BPG can be adjusted based on, e.g., environmental factors. One such adjustment is explained with reference to FIG. 5, which illustrates an MBS zone consistent with an exemplary embodiment. In the example of FIG. 5, an MBS zone 501, includes a BPG 502, and covers portions of a highway 503 and a sea 505. If in a typical time period there is higher traffic on highway 503 compared to sea 505, then the frequency of MSs entering or exiting MBS zone 501 through highway 503 may be larger than that of MSs entering or exiting the MBS zone through sea 505. Alternatively, it is possible that no MBS zone covers the area of the sea below MBS zone 501, so that no handoff to another MBS zone is needed in the lower part of MBS zone 501 which overlaps sea 505. In such a situation, in positioning BSs for MBS zone 501, a larger number of BSs are assigned to cover the intersection of BPG 502 with highway 503 than to cover the intersection of BPG 502 with sea 505.

Figures 6A, 6B:
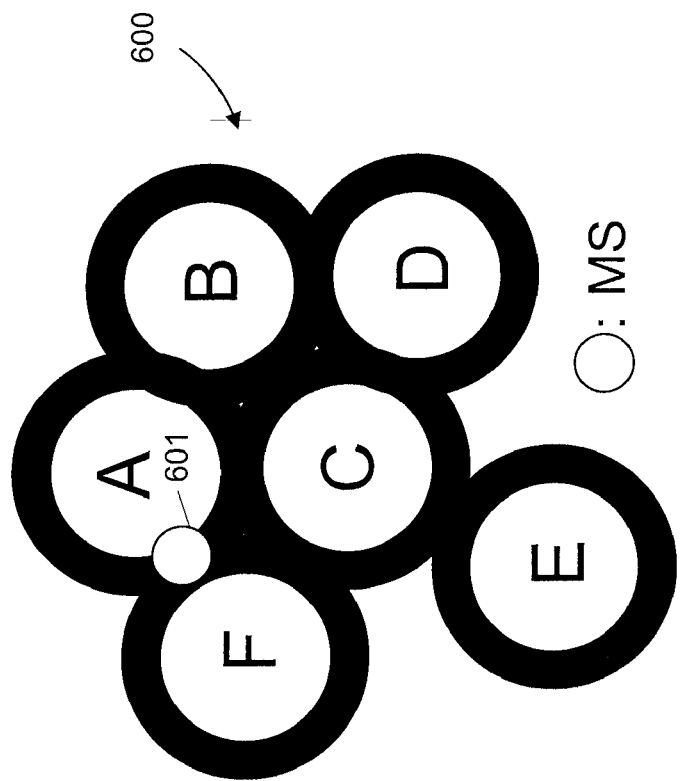
FIG. 6A illustrate multiple MBS zones, consistent with an exemplary embodiment.
FIG. 6B illustrates a neighbor table for an MBS zone shown in FIG. 6A, consistent with an exemplary embodiment.

In some embodiments, in order to perform inter-zone handoff, an MS also receives information about neighboring MBS zones. FIGS. 6A and 6B depict the content of neighbor information in accordance with some embodiments. More particularly, FIG. 6A illustrate a schematic 600 of six MBS zones, labeled A to E, consistent with an exemplary embodiment. In FIG. 6A, MBS zone A, for example, neighbors MBS zones B, C, and F, i.e., it shares portions of borders or partially overlaps with each of those neighboring MBS zones. FIG. 6A also depicts an MS 601, which is located in MBS zone A, near its boundary with MBS zone F.

In some embodiments, an idle MS in an MBS zone receives paging advertisements which include information about neighboring MBS zones in the form of an MBS zone neighbor list. FIG. 6B illustrates an exemplary MBS zone neighbor list, in the form of neighbor table 610. Exemplary neighbor table 610 is received and stored by MS 601. Neighbor table 610 informs MS 601 of the MBS zones that neighbor MBS zone A, in which MS 601 is located, and the paging group identification of the BPG for each of those neighboring MBS zones. The data in neighbor table 610 are organized in three rows 611-613, respectively corresponding to MBS zones B, C, and F which neighbor MBS zone A. In each row, the first column includes the identifications of the corresponding neighboring MBS, and the second column includes the BPG ID of the BPG for that neighboring MBS zone. For example, in row 611, the first column indicates the MBS zone ID for MBS zone B, and the second column indicates the BPG ID of $BPG_B$.

In some embodiments, while in MBS zone A, MS 601 receives and stores neighbor table 610 through paging advertisements that are periodically broadcast via an MBS channel. In some other embodiments, while MS 601 performs service discovery, it receives neighbor table 610 through a unicast mechanism, such as one provided by the WiMAX forum. In other embodiments, MS 601 receives this information before it starts using the MBS service in MBS zone A. In yet other embodiments, MS 601 receives the neighbor table through neighbor advertisements sent via a broadcast channel. MS 601 utilizes the neighbor table when it determines that it is approaching the boundary of MBS zone A, or that it has left MBS zone A, as explained in more detail below. When MS 601 enters a new MBS zone, it receives a new neighbor table corresponding to the new MBS zone and accordingly updates its internally stored neighbor table. For example, if MS 601 in FIG. 6A relocates from MBS zone A to MBS zone C, it will receive a new neighbor table which will include identifications of neighbors of MBS zone C, which are MBS zones A, B, D, E, and F, and their corresponding BPG IDs.

Figure 7A:
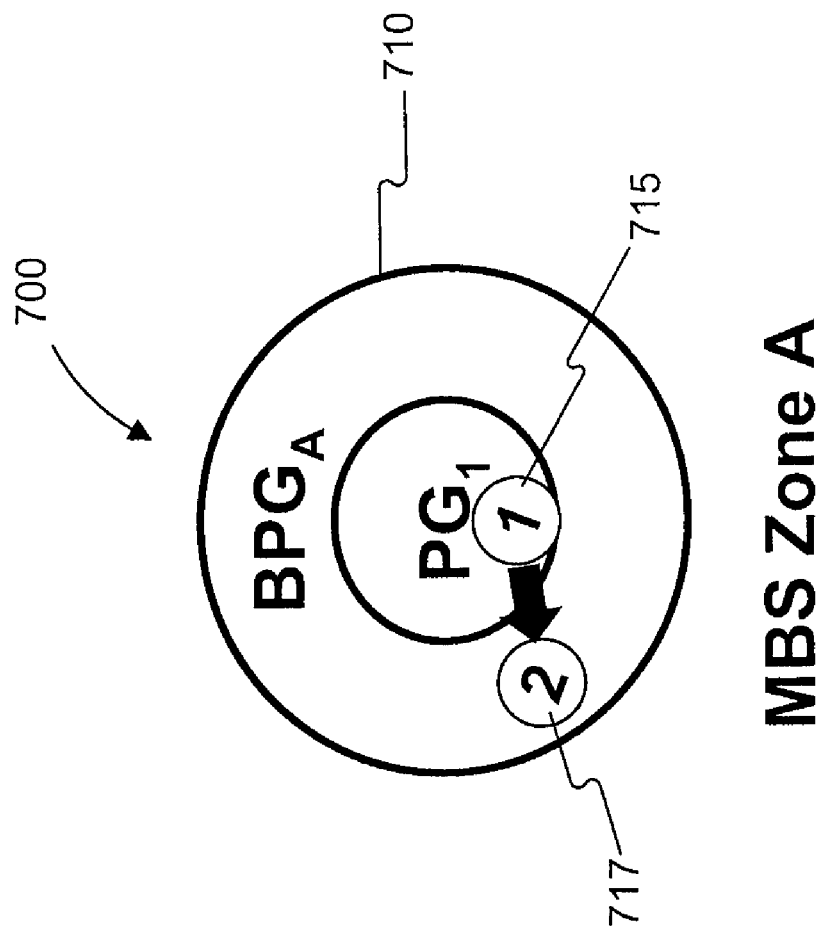
FIG. 7A illustrates a mobile station relocating from a non-boundary paging group to a boundary paging group, consistent with an exemplary embodiment.
Figure 7B:
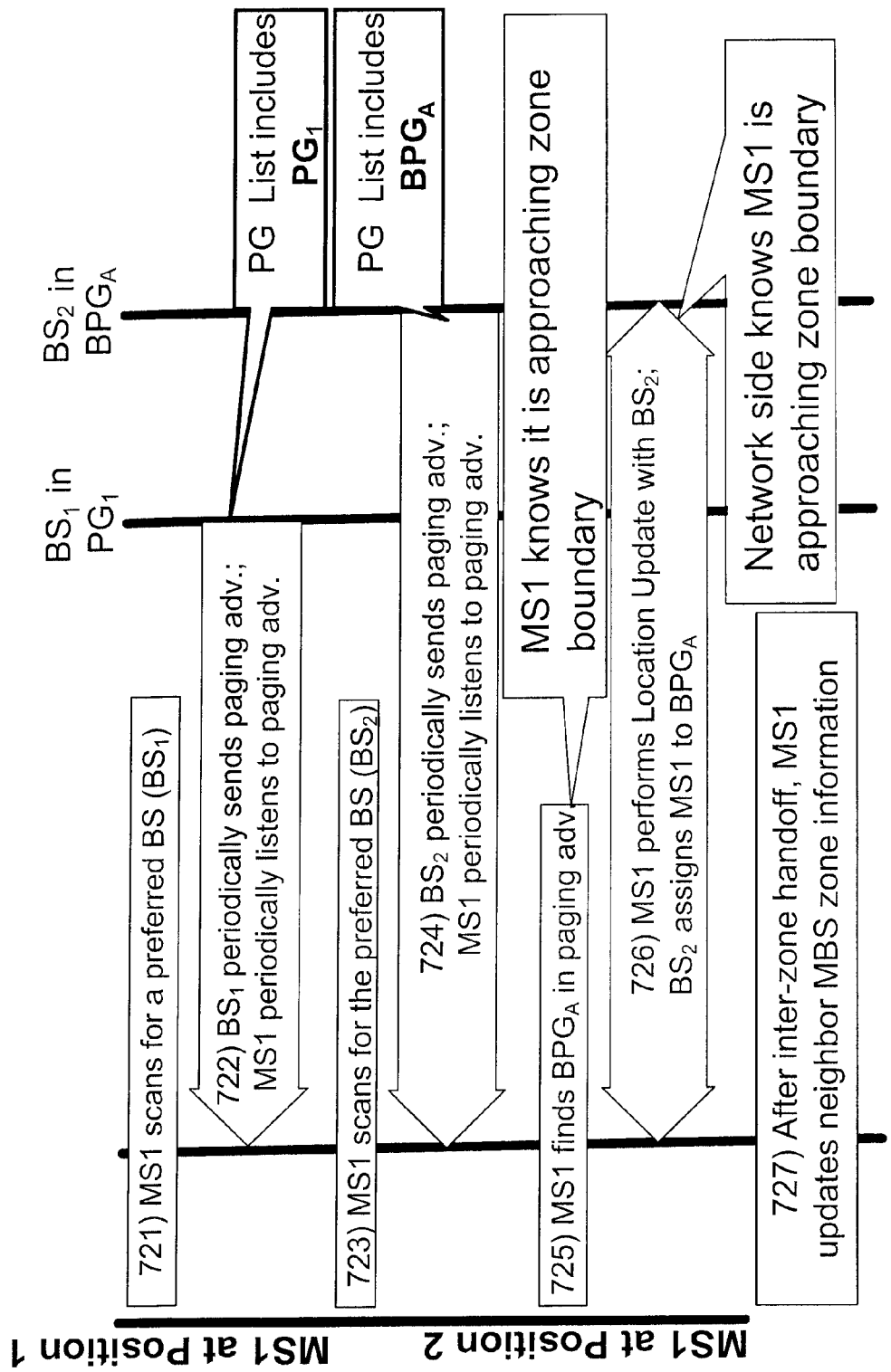
FIG. 7B illustrates an exemplary MBS zone boundary detection process performed during the relocation illustrated in FIG. 7A, consistent with an exemplary embodiment.

FIGS. 7A and 7B illustrate the mechanism by which an idle MS interacts with BSs when it enters a BPG, in accordance with some embodiments. FIG. 7A illustrates a scenario 700 in which a mobile station in an MBS zone relocates from a non-BPG to a BPG. FIG. 7A shows that an MBS zone 710 includes a non-BPG labeled $PG_1$, and a BPG labeled $BPG_A$. In scenario 700, an MS, hereinafter called MS1, moves from position 715, labeled position 1, to position 717, labeled position 2. Position 1 is located in $PG_1$ while position 2 is located in $BPG_A$.

FIG. 7B illustrates an exemplary MBS zone boundary detection process 720 performed during the relocation scenario 700 of FIG. 7A, consistent with an exemplary embodiment. Exemplary process 720 includes steps 721 to 727, of which steps 721 and 722 are performed while MS1 is at position 1, steps 723 to 726 are performed while MS1 is at position 2, and step 727 is performed after MS1 moves from position 2 to a different MBS zone. At position 1, MS1 is covered by base station $BS_1$ located in $PG_1$. At position 2, MS1 is covered by base station $BS_2$ located in $BPG_A$.

While at position 1, MS1 interacts with $BS_1$. In step 721, during a waking period, MS1 scans for a preferred BS for receiving signals and chooses $BS_1$ which covers position 1. Thereafter, in step 722, MS1 listens for paging advertisements that it receives from $BS_1$. These paging advertisements include a PG list including a PG ID of $PG_1$, to which $BS_1$ belongs. MS1 therefore identifies itself with $PG_1$.

When MS1 moves to position 2, MS1 switches to interacting with $BS_2$. In step 723, during a waking period, MS1, which has moved to position 2, scans for a preferred BS for receiving signals and chooses $BS_2$ which covers position 2. Thereafter, in step 724, MS1 listens for paging advertisements that it receives from $BS_2$. These paging advertisements include a PG list including BPG ID of $BPG_A$, to which $BS_2$ belongs. Therefore, as shown in step 725, MS1 identifies itself with $BPG_A$. In some embodiments, MS1 recognizes that it has entered a BPG because the ID of $BPG_A$ includes an attribute of a BPG ID. In some other embodiments, MS1 recognizes that it has entered a BPG by identifying the ID of $BPG_A$ in a BPG ID list that it has received and stored earlier. A BPG ID list includes a list of paging group IDs for all BPGs in a network area and can be sent by a controller to all MSs in that network area.

In step 726, MS1 performs a location update with $BS_2$, as a result of which $BS_2$ determines that MS1 has entered $BPG_A$ and assigns MS1 to $BPG_A$. In some embodiments, this assignment is performed by updating a PG assignment table which tracks the PG which covers each idle MS1 in a coverage area. In some embodiments, the information is sent by $BS_2$ to a controller, which in turn updates the PG assignment information for MS1. In some other embodiments, upon the assignment, BS2 also sends a message to MS1, commanding it to join $BPG_A$. MS1 can join $BPG_A$ by, for example, updating its internally stored information, indicating that it is covered by $BPG_A$.

At position 2, MS1 receives paging advertisements which include the neighbor table for MBS zone 710. In some embodiments using wireless broadcast networking, MS1 receives the neighbor table through a Broadcast Control Pointer IE in a DL-MAP of its preferred BS. As shown in step 727, if the MS moves to a new MBS zone, it will be handed off to the new MBS zone, and the MS will update its neighbor table to that of the new MBS zone. Through Broadcast Control Pointer IE, the network side can notify MS when to receive the neighbor advertisements with the neighbor MBS zone information.

Figure 8B:
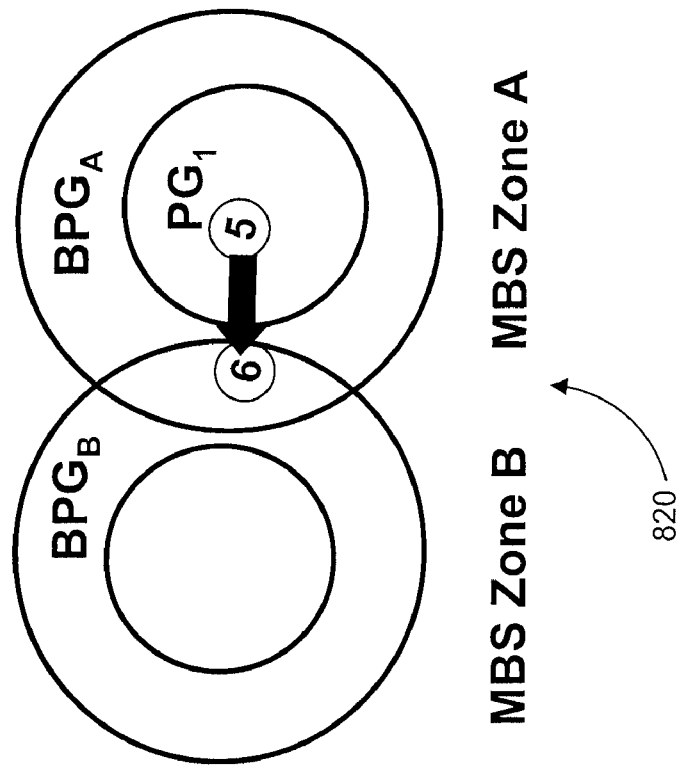
FIGS. 8A and 8B illustrate a mobile station relocating to the intersection of two neighboring MBS zones, in accordance with an exemplary embodiment.
Figure 8A:
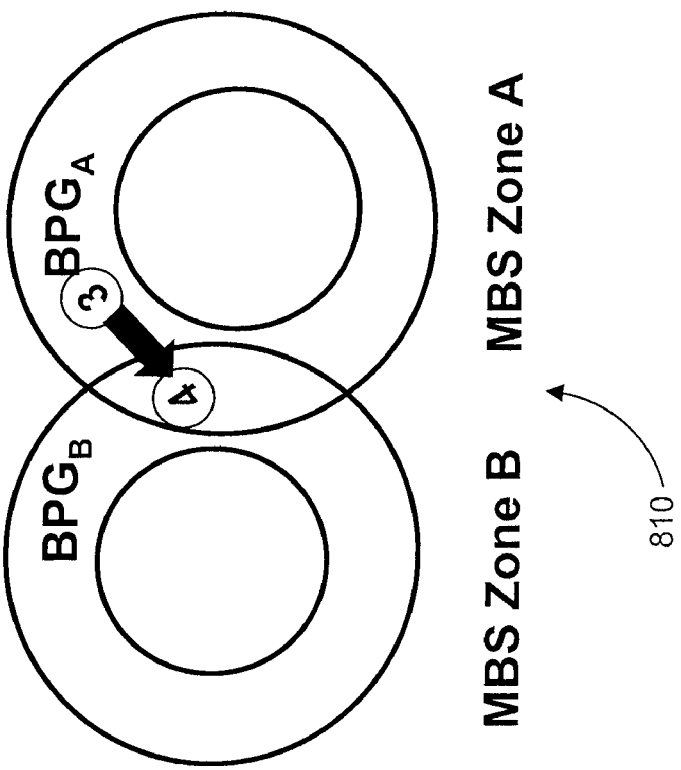

FIGS. 8A-8D illustrate processes performed when an MS enters the intersection of BPGs of two neighboring MBS zones, in accordance with some embodiments. FIGS. 8A and 8B depict two neighboring zones MBS zone A and MBS zone B, with overlapping boundary paging groups, $BPG_A$ and $BPG_B$, respectively. FIG. 8A further illustrates a relocation scenario 810 in which a mobile station (hereinafter called MS2) relocates from a position 3 located inside $BPG_A$ but outside the intersection of $BPG_A$ and $BPG_B$, to a position 4 located inside that intersection. FIG. 8B, on the other hand, illustrates a different relocation scenario 820 in which a mobile station (hereinafter called MS3) relocates from a position 5 located inside a non-BPG $PG_1$ of MBS zone A, to a position 6 located in the intersection of $BPG_A$ and $BPG_B$.

Figure 8C:
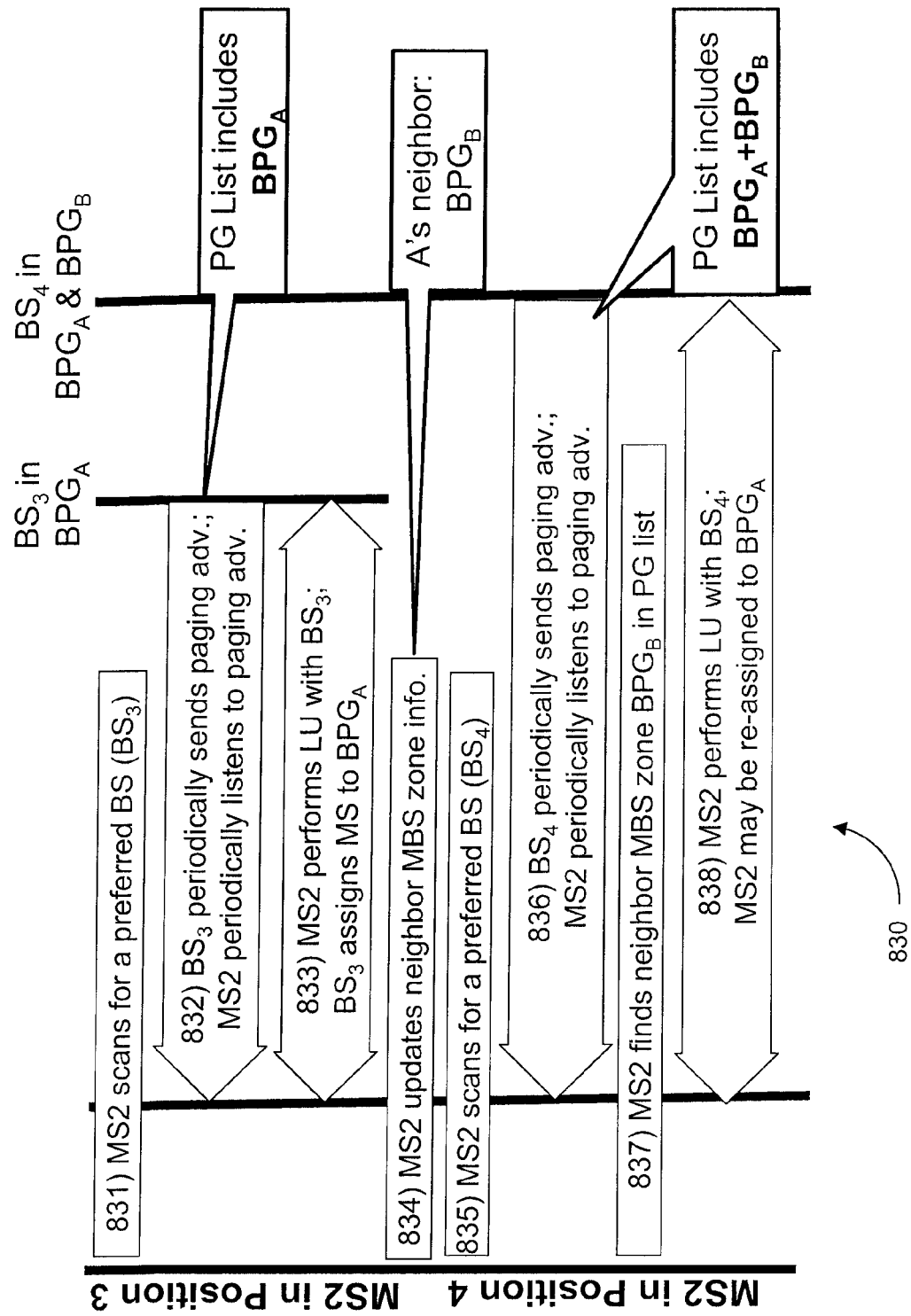
FIGS. 8C and 8D illustrate exemplary MBS zone boundary detection processes performed during the relocations illustrated in FIGS. 8A and 8B, respectively, consistent with exemplary embodiments.

FIG. 8C illustrates an exemplary MBS zone boundary detection process 830 performed during the relocation scenario 810 of FIG. 8A, consistent with an exemplary embodiment. Exemplary process 830 includes steps 831 to 839, of which steps 831 to 834 are performed while mobile station MS2 is at position 3, and steps 835 to 839 are performed while MS2 is at position 4. At position 3, MS2 is covered by base station $BS_3$ located in $BPG_A$, and at position 4, MS2 is covered by base station $BS_4$ located inside the intersection $BPG_A$ and $BPG_B$. $BS_4$ therefore sends advertisements of MBS zones A in synchronization with BSs in MBS zone A, and also advertisements of MBS zone B in synchronization with BSs in MBS zone B.

While at position 3, MS2 interacts with $BS_3$. In step 831, MS2 scans for a preferred BS for receiving signals and chooses $BS_3$ which covers position 3. Thereafter, in step 832, MS2 listens for paging advertisements that it receives from $BS_3$. These paging advertisements include a PG list including a BPG ID of $BPG_A$, to which $BS_3$ belongs. MS2 therefore determines that it is located in a BPG. In step 833, MS2 performs a location update with $BS_3$, as a result of which $BS_3$ determines that MS2 is located inside $BPG_A$ and assigns MS2 to $BPG_A$, if not so assigned already. In some embodiments, $BS_3$ commands MS2 to join $BPG_A$. In step 834, MS2 also receive the neighbor table associated with MBS zone A. In some embodiments, MS2 locates and accesses the neighbor advertisement by referencing a Broadcast Control Pointer IE in a DL-MAP of the preferred BS. Through Broadcast Control Pointer IE, the network side can notify MS2 when to receive the neighbor advertisements with the neighbor MBS zone information.

When MS2 moves to position 4, it switches to interacting with $BS_4$. In step 835, MS2 scans for a preferred BS for receiving signals and chooses $BS_4$ which covers position 4. Thereafter, in step 836, MS2 listens for paging advertisements that it receives from $BS_4$. These paging advertisements include a PG list including BPG IDs of $BPG_A$ and $BPG_B$, to both of which $BS_4$ belongs. In step 837, MS2 identifies the BPG ID of $BPG_B$ as one of the BPG IDs in the neighbor table for MBS zone A, and therefore determines that it is in the BPG of a neighboring MBS zone.

In step 838, MS2 performs a location update with $BS_4$, as a result of which $BS_4$ determines that MS2 has entered the intersection of $BPG_A$ and $BPG_B$. At this stage, as shown in step 838, MS2 may be re-assigned to $BPG_A$. Alternatively, as shown in step 839, MS2 may be handed off from MBS zone A to MBS zone B, and be assigned to $BPG_B$. In some embodiments, MS2 is handed off to MBS zone B, upon the determination that MS2 has moved from outside to inside an intersection of two BPGs, and therefore it might be exiting MBS zone A. In other embodiments, MS2 is handed off to MBS zone B based on other administrative considerations, for example, to balance communication traffic inside MBS zone A and MBS zone B.

Figure 8D:
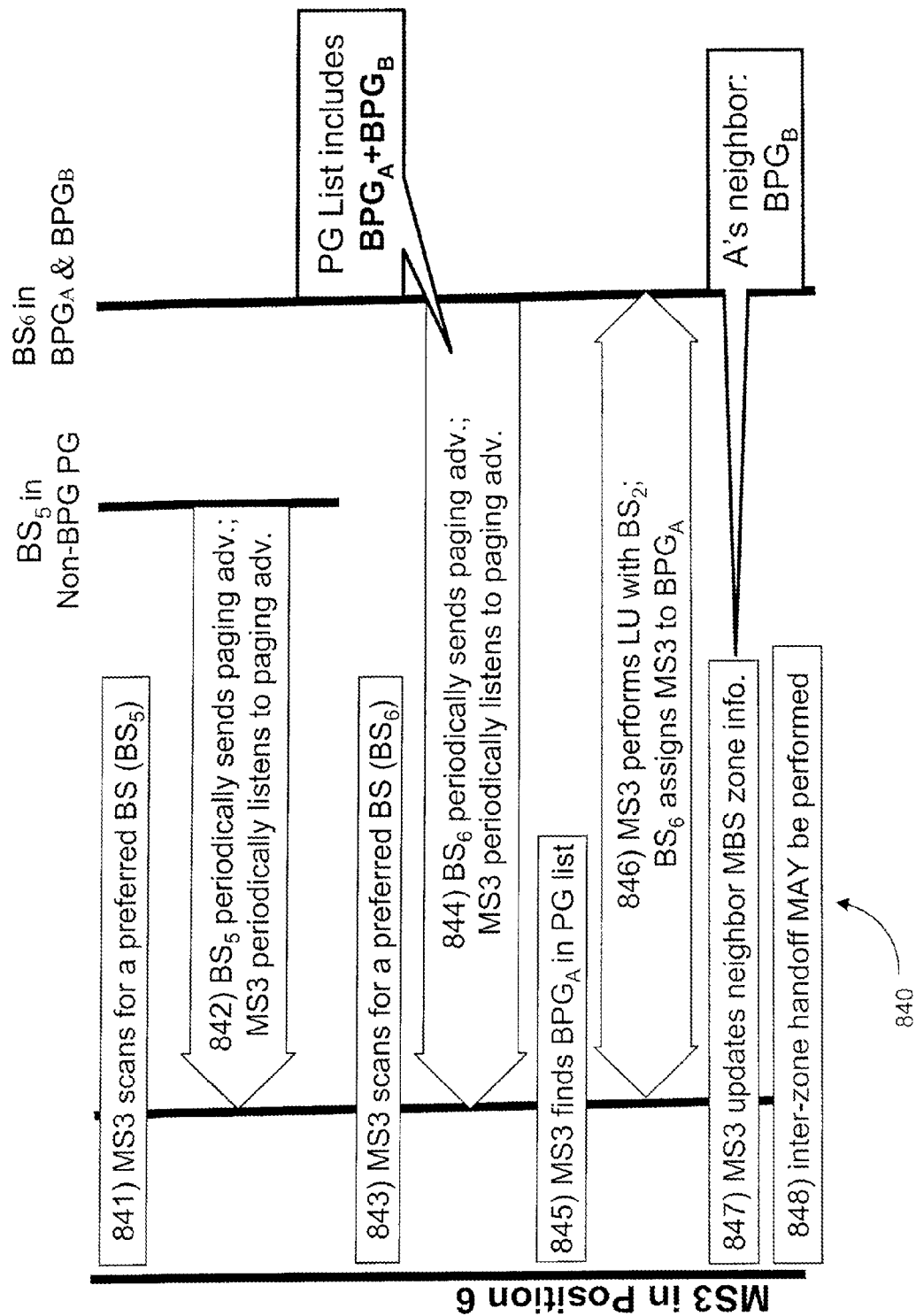

FIG. 8D illustrates an exemplary MBS zone boundary detection process 840 performed during the relocation scenario 820 of FIG. 8B, consistent with an exemplary embodiment. Exemplary process 840 includes steps 841 to 848, of which steps 841 and 842 are performed while mobile station MS3 is at position 5, and steps 843 to 848 are performed while MS3 is at position 6. At position 5, MS3 is covered by base station $BS_5$ located in non-BPG $PG_1$, and at position 6, MS3 is covered by base station $BS_6$ located in the intersection $BPG_A$ and $BPG_B$.

While at position 5, MS3 interacts with $BS_5$. In step 841, MS3 scans for a preferred BS for receiving signals and chooses $BS_5$ which covers position 5. Thereafter, in step 842, MS3 listens for paging advertisements that it receives from $BS_5$.

When MS3 moves to position 6, it switches to interacting with $BS_6$. In step 843, MS3 scans for a preferred BS for receiving signals and chooses $BS_6$ which covers position 6. Thereafter, in step 844, MS3 listens for paging advertisements that it receives from $BS_6$. These paging advertisements include a PG list including BPG IDs of $BPG_A$ and $BPG_B$, to both of which $BS_6$ belongs. In step 845, MS3 identifies the BPG ID of $BPG_A$ as a boundary paging group ID, and therefore MS3 determines that it is located in a BPG. In step 846, MS3 performs a location update with $BS_6$, as a result of which $BS_6$ determines that MS3 has entered $BPG_A$ and assigns MS2 to $BPG_A$. In step 847, MS3 also receives the neighbor table associated with MBS zone A. This neighbor table includes the paging group ID of $BPG_B$. At this stage, MS3 may also be handed off from MBS zone A to MBS zone B, and be assigned to $BPG_B$, as shown in step 848.

Figure 9A:
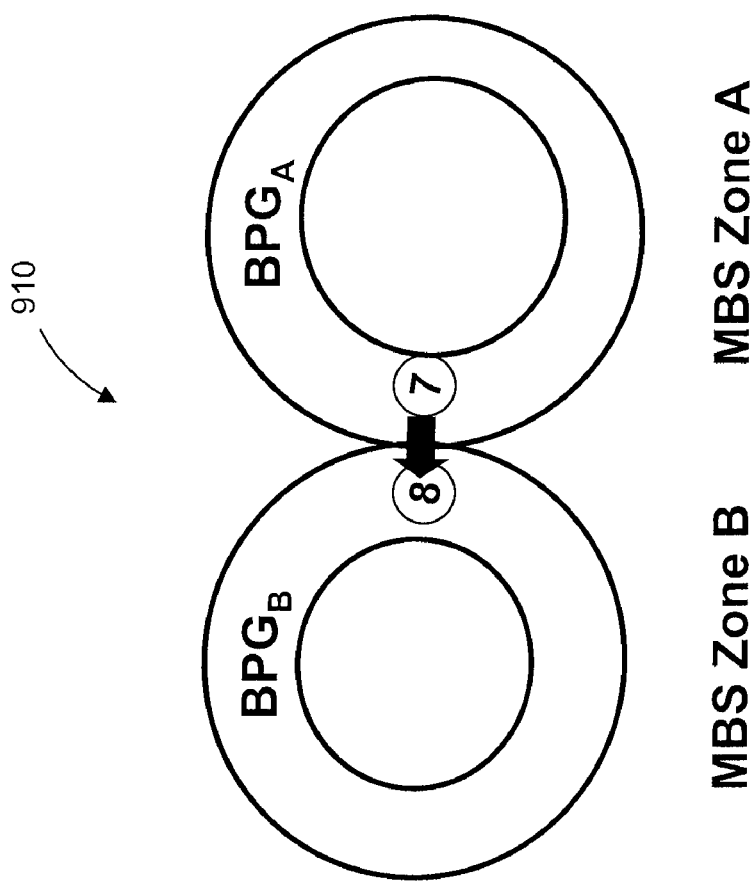
FIG. 9A illustrates a mobile station relocating from a boundary paging group to another boundary paging group, consistent with an exemplary embodiment.
Figure 9B:
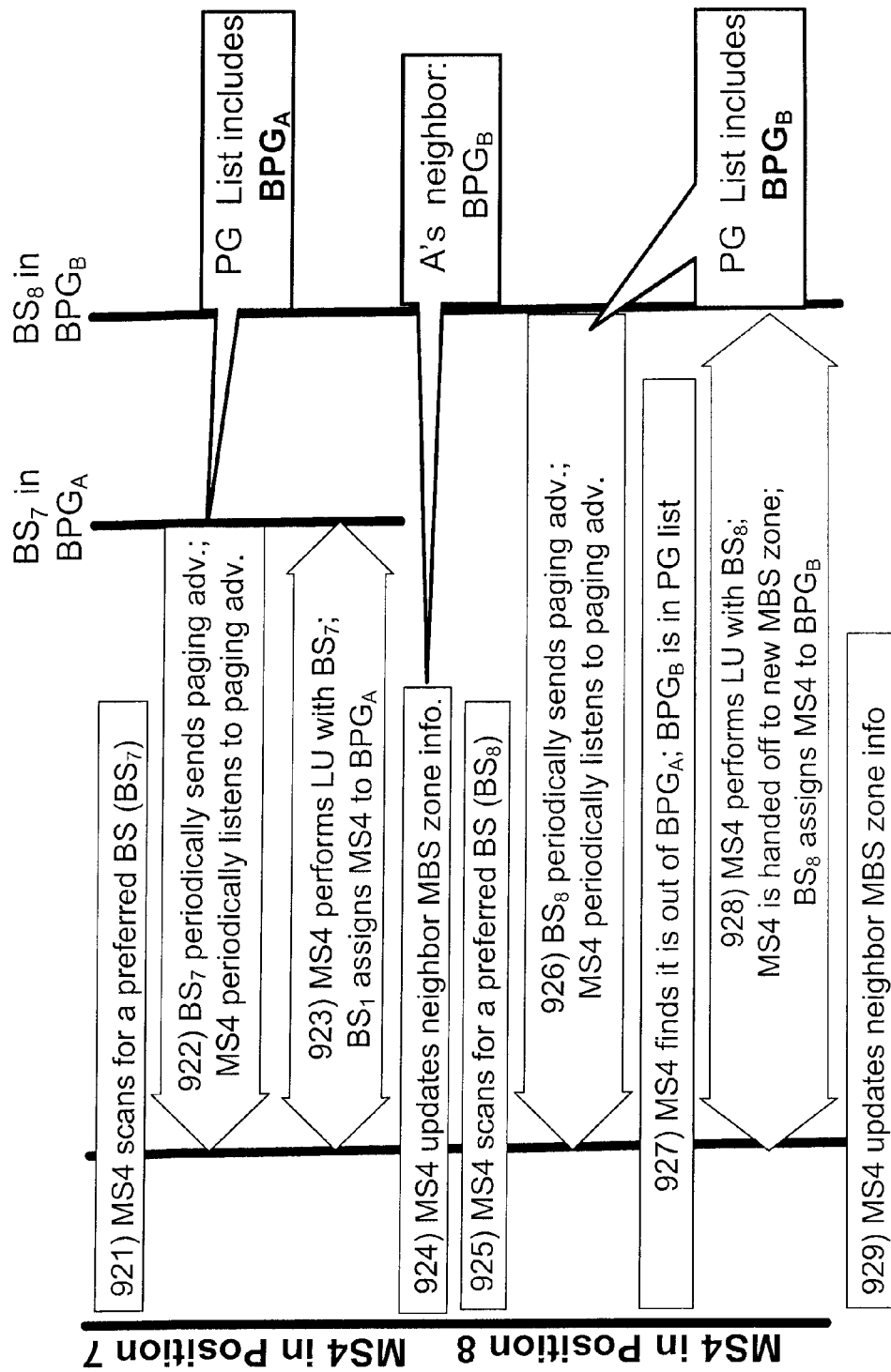
FIG. 9B illustrates an exemplary MBS zone boundary detection process performed during the relocation illustrated in FIG. 9A, consistent with an exemplary embodiment.

FIGS. 9A and 9B illustrate exemplary processes performed when an MS leaves one BPG area and enters a different BPG area, in accordance with some embodiments. FIG. 9A depicts two neighboring zones MBS zone A and MBS zone B, with boundary paging groups, $BPG_A$ and $BPG_B$, respectively. FIG. 9A further illustrates scenario 910 in which a mobile station (hereinafter called MS4) relocates from a position 7 inside $BPG_A$ to a position 8 inside $BPG_B$. While $BPG_A$ and $BPG_B$ may or may not be overlapping, positions 7 and 8 are located in non-overlapping parts of $BPG_A$ and $BPG_B$, respectively.

FIG. 9B illustrates an exemplary MBS zone boundary detection process 920 performed during the relocation scenario 910 of FIG. 9A, consistent with some embodiments. Exemplary process 920 includes steps 921 to 929, of which steps 921 to 924 are performed while mobile station MS4 is at position 7, and steps 925 to 929 are performed while MS4 is at position 8. At position 7, MS4 is covered by base station $BS_7$ in $BPG_A$, and at position 8, MS4 is covered by base station $BS_8$ in $BPG_B$.

While at position 7, MS4 interacts with $BS_7$. In step 921, MS4 scans for a preferred BS for receiving signals and chooses $BS_7$ which covers position 7. Thereafter, in step 922, MS4 listens for paging advertisements that it receives from $BS_7$. These paging advertisements include a PG list including BPG ID of $BPG_A$, to which $BS_7$ belongs. MS4 therefore determines that it is located in a BPG. In step 923, MS4 performs a location update with $BS_7$, as a result of which $BS_7$ determines that MS4 has entered $BPG_A$ and assigns MS4 to $BPG_A$. In some embodiments, $BS_7$ commands MS4 to join $BPG_A$. In step 924, MS4 also receives the neighbor table associated with MBS zone A. This neighbor table includes the paging group ID of $BPG_B$. In some embodiments, MS4 updates the neighbor MBS zone information by locating and accessing the neighbor advertisement by referencing a Broadcast Control Pointer IE in a DL-MAP of the preferred BS. Through Broadcast Control Pointer IE, the network side can notify MS4 when to receive the neighbor advertisements with the neighbor MBS zone information.

When MS4 moves to position 8, it switches to interacting with $BS_8$. In step 925, MS4 scans for a preferred BS for receiving signals and chooses $BS_8$ which covers position 8. Thereafter, in step 926, MS4 listens for paging advertisements that it receives from $BS_8$. These paging advertisements include a PG list that does not include the BPG ID of $BPG_A$ and instead includes BPG ID of $BPG_B$, to which $BS_8$ belongs. In step 927, MS4 identifies the BPG ID of $BPG_B$ as one of the BPG IDs in the neighbor table for MBS zone A. Therefore, MS4 determines that it has left the BPG of MBS zone A, and has entered the BPG of the neighboring MBS zone B.

In step 928, MS4 performs a location update with BS8, as a result of which $BS_8$ determines that MS4 has entered $BPG_B$. At this stage, MS4 is handed off from MBS zone A to MBS zone B, and is assigned to BPGB. In step 929, MS4 receives the neighbor table associated with MBS zone B and updates its neighbor information.

Figure 10:
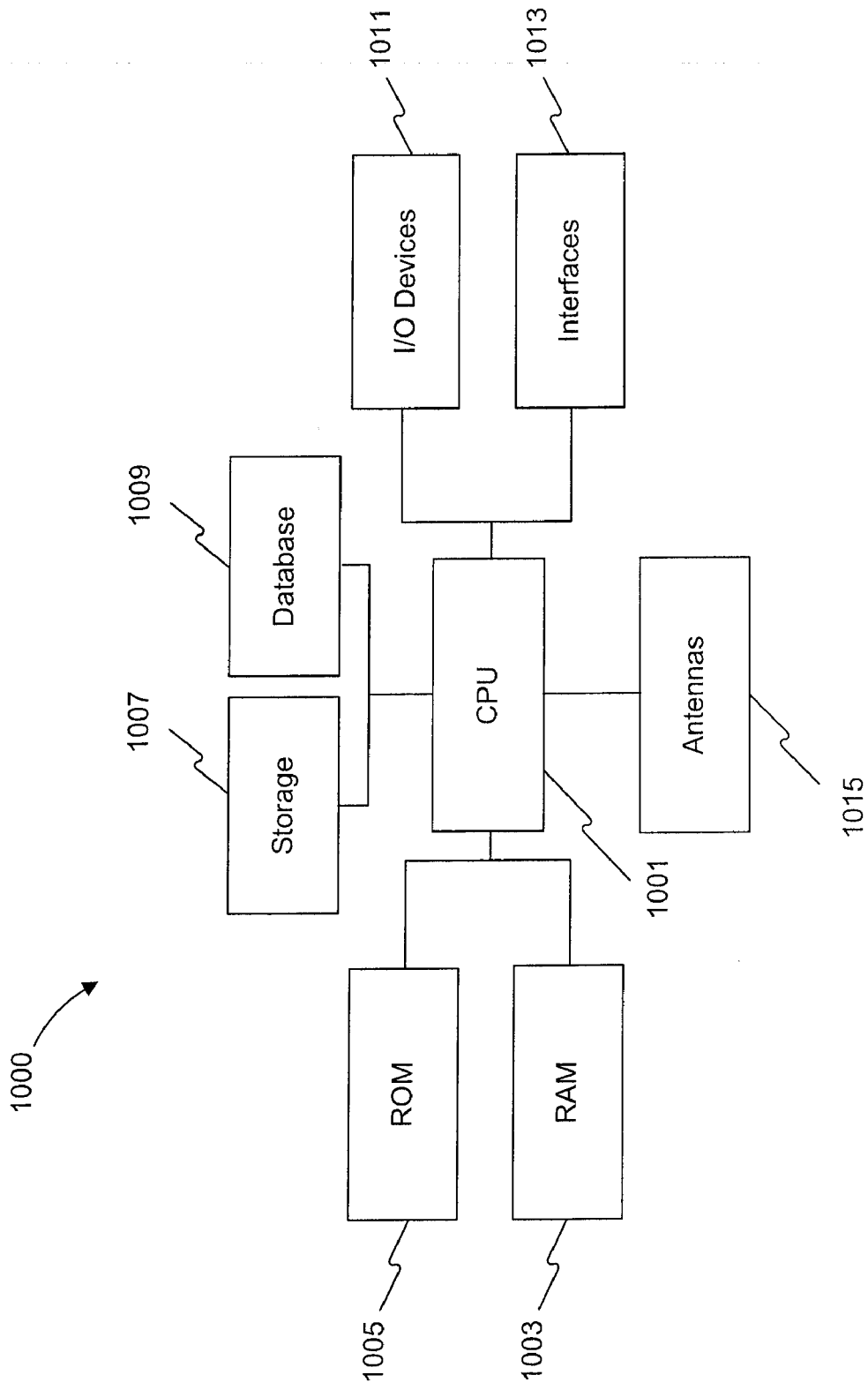
FIG. 10 illustrates a block diagram of an exemplary base station, consistent with an exemplary embodiment.

FIG. 10 illustrates a block diagram of an exemplary BS 1000, consistent with an exemplary embodiment. The BSs included in any of the above described embodiments may be configured as BS 1000. BS 1000 may include one or more of the following components: a central processing unit (CPU) 1001 configured to execute computer program instructions to perform various processes and methods, random access memory (RAM) 1003 and read only memory (ROM) 1005 configured to access and store information and computer program instructions, storage 1007 to store data and information, database 1009 to store tables, lists, or other data structures, I/O devices 1011, interfaces 1013, antennas 1015, etc. Each of these components is well-known in the art and will not be discussed further.

Figure 11:
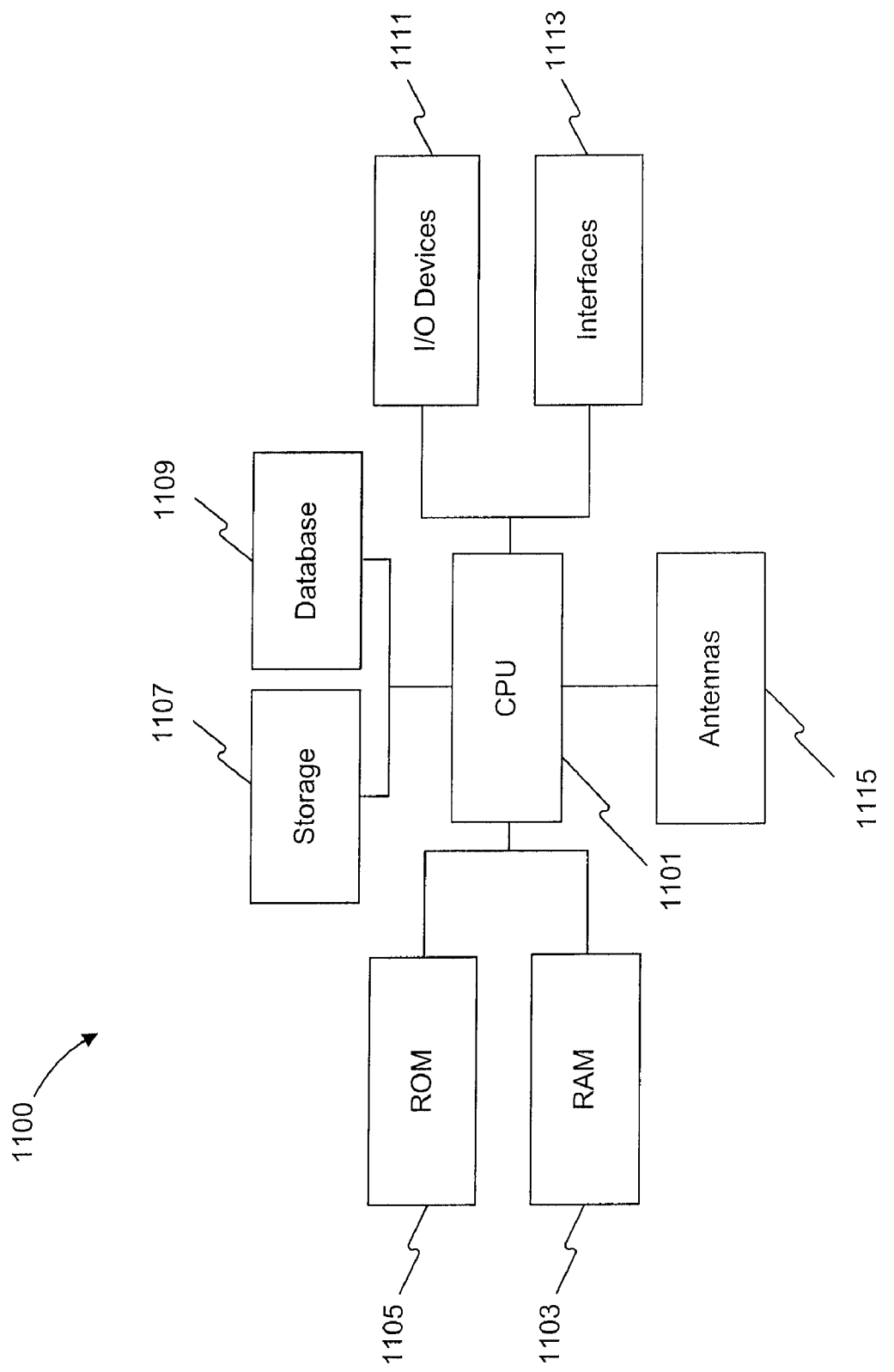
FIG. 11 illustrates a block diagram of an exemplary mobile station, consistent with an exemplary embodiment.

FIG. 11 illustrates a block diagram of an exemplary MS 1100, consistent with an exemplary embodiment. The MSs included in any of the above described embodiments may be configured as MS 1100. MS 1100 may include one or more of the following components: a central processing unit (CPU) 1101 configured to execute computer program instructions to perform various processes and methods, random access memory (RAM) 1103 and read only memory (ROM) 1105 configured to access and store information and computer program instructions, storage 1107 to store data and information, database 1109 to store tables, lists, or other data structures, I/O devices 1111, interfaces 1113, antennas 1115, etc. Each of these components is well-known in the art and will not be discussed further.

Figure 12:
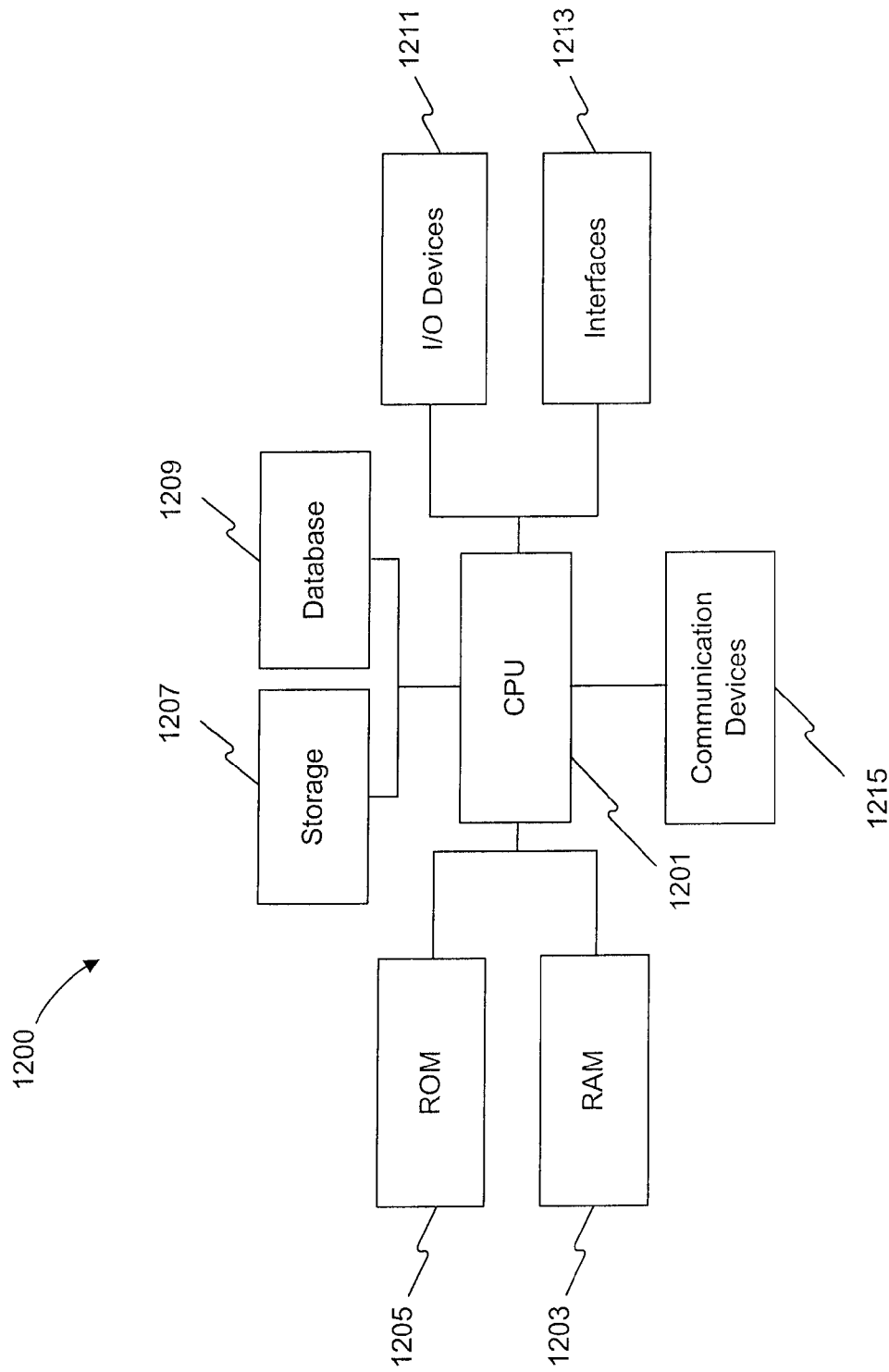
FIG. 12 illustrates a block diagram of an exemplary controller, consistent with an exemplary embodiment.

FIG. 12 illustrates a block diagram of an exemplary controller 1200, consistent with an exemplary embodiment. The controller stations included in any of the above described embodiments may be configured as controller 1200. Controller 1200 may include one or more of the following components: a central processing unit (CPU) 1201 configured to execute computer program instructions to perform various processes and methods, random access memory (RAM) 1203 and read only memory (ROM) 1205 configured to access and store information and computer program instructions, storage 1207 to store data and information, database 1209 to store tables, lists, or other data structures, I/O devices 1211, interfaces 1213, and communication devices 1215, etc. Each of these components is well-known in the art and will not be discussed further. Communication devices 1215 may include antennas for wireless communication or wired communication interfaces, e.g., Ethernet cards. Controller 1200 may be a network controller in communication with one or more BSs in the network, a PG controller in communication with one or BSs in one or more paging groups, or an MBS controller in communication with one or more BSs covering one or more MBS zones. As previously noted, a controller may also be a hybrid controller which performs the functions of two or more types of controllers, or a controller of one type that communicates and cooperates with a controller of another type, or both.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless communication method for providing zone boundary detection performed by a controller managing communications within a multicast/broadcast service (MBS) zone, the method comprising:
    assigning to a boundary paging group a first base station communicating within the MBS zone and near a boundary of the MBS zone, wherein a location near the boundary of the MBS zone is a location that is covered by a boundary base station that also covers a section of the boundary of the MBS zone; and
    transmitting, through a second base station which covers a mobile station, to the mobile station information indicating that the boundary paging group corresponds to locations near the boundary of the MBS zone.

2. The method of claim 1, wherein the second base station is communicating within the MBS zone and near the boundary of the MBS zone, the method further comprising:
    assigning the second base station to the boundary paging group; and
    transmitting to the mobile station information indicating that the second base station is assigned to the boundary paging group.

3. The method of claim 1, wherein the MBS zone is a first MBS zone and the second base station is communicating within a second MBS zone that neighbors the first MBS zone, wherein the transmitting includes transmitting to the mobile station a neighbor table for the second MBS zone, the neighbor table containing information indicating that the boundary paging group corresponds to locations near the boundary of the first MBS zone.

4. The method of claim 3, wherein the boundary paging group is a first boundary paging group, the method further comprising:
    assigning the second base station to the first boundary paging group and to a second boundary paging group corresponding to locations near a boundary of the second MBS zone, indicating that the second base station is communicating within an area located inside both the first and the second MBS zones, wherein a location near the boundary of the second MBS zone is a location that is covered by a second boundary base station that also covers a section of the boundary of the second MBS zone;
    transmitting, through the second base station to the mobile station, information indicating that the second base station is assigned to both the first boundary paging group and the second boundary paging group, and indicating that the mobile station is located within the area located inside both the first and the second MBS zones.

5. The method of claim 1, further comprising:
    assigning to a non-boundary paging group a third base station located inside the MBS zone and away from the boundary of the MBS zone, wherein a location away from the boundary of the MBS zone is a location that is not near the boundary of the MBS zone; and
    setting a first paging frequency for the first base station to be higher than a second paging frequency for the third base station.

6. The method of claim 1, wherein the mobile station is a first mobile station, the method further comprising:
    receiving, through the first base station a location update from a second mobile station covered by the first base station; and
    assigning the second mobile station to the boundary paging group.

7. A wireless communication method for providing zone boundary detection performed by a base station within a multicast/broadcast service (MBS) zone, the method comprising:
    receiving information from a controller managing communications within the MBS zone, the information indicating that a boundary paging group corresponds to locations near a boundary of the MBS zone, wherein a location near the boundary of the MBS zone is a location that is covered by a boundary base station that also covers a section of the boundary of the MBS zone; and
    transmitting the information regarding the boundary paging group to a mobile station covered by the base station.

8. The method of claim 7, wherein the MBS zone is a first MBS zone and the boundary paging group is a first boundary paging group, the method further comprising transmitting to the mobile station a neighbor table for the first MBS zone, indicating that a second boundary paging group corresponds to locations near the boundary of a second MBS zone which neighbors the first MBS zone, wherein a location near the boundary of the second MBS zone is a location that is covered by a second boundary base station that also covers a section of the boundary of the second MBS zone.

9. The method of claim 7, further comprising transmitting to the mobile station information that the base station is assigned to the boundary paging group, indicating that the mobile station is communicating within the MBS zone and near the boundary of the MBS zone.

10. The method of claim 9, further comprising receiving a location update from the mobile station, and assigning the mobile station to the boundary paging group.

11. The method of claim 8, further comprising transmitting to the mobile station information that the base station is assigned to the first boundary paging group and to the second boundary paging group, indicating that the mobile station is communicating within an area located inside both the first and the second MBS zones.

12. The method of claim 11, further comprising receiving a location update from the mobile station, and assigning the mobile station to the first boundary paging group.

13. A zone boundary detection method performed by a mobile station, the method comprising:
    storing information indicating that a boundary paging group corresponds to locations near a boundary of a multicast/broadcast service (MBS) zone, wherein a location near the boundary of the MBS zone is a location that is covered by a boundary base station that also covers a section of the boundary of the MBS zone;
    receiving information, from a base station which covers the mobile station, including information about a paging group of the base station; and identifying that the mobile station is communicating near the boundary of the MBS zone, if the paging group of the base station is the same as the boundary paging group.

14. The method of claim 13, further comprising transmitting to the base station a location update signal, if identified that the mobile station is communicating near the boundary of the MBS zone.

15. The method of claim 14, further comprising receiving commands from the base station for the mobile station to join the boundary paging group.

16. The method of claim 13, wherein the MBS zone is a first MBS zone and the base station is assigned to a second MBS zone which neighbors the first MBS zone, and wherein the information includes a neighbor table for the second MBS zone indicating that the boundary paging group corresponds to locations near the boundary of the first MBS zone.

17. The method of claim 16, wherein the boundary paging group is a first boundary paging group, the method further comprising receiving, from the base station, information indicating that the base station is assigned to the first boundary paging group and to a second boundary paging group corresponding to locations near a boundary of the second MBS zone, indicating that the mobile station is communicating within an area located inside both the first and the second MBS zones, wherein a location near the boundary of the second MBS zone is a location that is covered by a second boundary base station that also covers a section of the boundary of the second MBS zone.

18. The method of claim 13, wherein the receiving or the identifying is performed while the mobile station is in an idle mode.

19. A base station comprising:
    a storage for storing information about a boundary paging group for the base station, corresponding to locations near a boundary of a multicast/broadcast system (MBS) zone, wherein a location near the boundary of the MBS zone is a location that is covered by a boundary base station that also covers a section of the boundary of the MBS zone; and
    a transmitter for transmitting the information about the boundary paging group to a mobile station covered by the base station.

20. The base station of claim 19, further comprising a receiver for receiving a location update from the mobile station, and wherein the transmitter transmits to the mobile station commands for assigning the mobile station to the boundary paging group.

21. A mobile station comprising:
    a storage for storing information which corresponds a boundary paging group with locations near a boundary of a multicast/broadcast system (MBS) zone, wherein a location near the boundary of the MBS zone is a location that is covered by a boundary base station that also covers a section of the boundary of the MBS zone;
    a receiver for receiving information about a paging group of a base station which covers the mobile station; and
    a processing unit for comparing the paging group of the base station with the boundary paging group, and for determining that the mobile station is communicating near the boundary of the MBS zone, if the paging group is the same as the boundary paging group.

22. The mobile station of claim 21, further comprising a transmitter for transmitting to the base station a location update signal, if determined that the mobile station is communicating near the boundary of the MBS zone.

23. The mobile station of claim 22, wherein the receiver is further for receiving commands from the base station to the mobile station to join the boundary paging group.

24. The mobile station of claim 22, wherein the MBS zone is a first MBS zone and the mobile station is communicating in a second MBS zone neighboring the first MBS zone, and wherein the information includes a neighbor table for the second MBS zone.

\* \* \* \* \*